United States Patent
Harper et al.

(10) Patent No.: US 10,424,333 B2
(45) Date of Patent: *Sep. 24, 2019

(54) ATTENUATING REACTION FORCES CAUSED BY EXTERNALLY SUPPORTED STATORS IN BRUSHLESS DC MOTORS

(71) Applicant: International Business Machines Corporation, Armonk, NY (US)

(72) Inventors: David H. F. Harper, Vail, AZ (US); Kevin B. Judd, Tucson, AZ (US); Armando Argumedo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,566

(22) Filed: Jan. 10, 2018

(65) Prior Publication Data

US 2019/0214050 A1    Jul. 11, 2019

(51) Int. Cl.

| | |
|---|---|
| *G11B 15/32* | (2006.01) |
| *G11B 5/008* | (2006.01) |
| *H02K 5/24* | (2006.01) |
| *G11B 19/20* | (2006.01) |
| *G11B 15/18* | (2006.01) |

(52) U.S. Cl.
CPC .......... *G11B 15/32* (2013.01); *G11B 5/00813* (2013.01); *G11B 19/2009* (2013.01); *G11B 19/2018* (2013.01); *H02K 5/24* (2013.01); *G11B 15/1883* (2013.01)

(58) Field of Classification Search
None
See application file for complete search history.

(56) References Cited

U.S. PATENT DOCUMENTS

| | | | | |
|---|---|---|---|---|
| 1,688,891 | A | * 10/1928 | Spreen | .................. H02K 1/185 |
| | | | | 310/410 |
| 4,647,803 | A | 3/1987 | von der Heide et al. | |
| 4,825,983 | A | * 5/1989 | Nakanishi | ........... F16F 15/1485 |
| | | | | 188/218 A |
| 4,841,186 | A | 6/1989 | Feigel et al. | |

(Continued)

FOREIGN PATENT DOCUMENTS

| | | | | |
|---|---|---|---|---|
| CN | 102255466 A | * 11/2011 | ........... | F04D 29/668 |
| CN | 202190130 U | * 4/2012 | ............. | H02K 1/185 |

(Continued)

OTHER PUBLICATIONS

Harper et al., U.S. Appl. No. 15/867,556, filed Jan. 10, 2018.

(Continued)

*Primary Examiner* — William J Klimowicz
(74) *Attorney, Agent, or Firm* — Zilka-Kotab, P.C.

(57) ABSTRACT

An apparatus, according to one embodiment, includes: a support plate, a stator, at least one isolation mount coupled between the support plate and the stator for reducing transfer of vibration from the stator to the support plate, and a rotor sub-assembly. Furthermore, the rotor sub-assembly is configured to rotate relative to the support plate and the stator, the rotor sub-assembly including: a magnet, and a hub rotatably fixed relative to the magnet. Other systems, methods, and computer program products are described in additional embodiments.

19 Claims, 14 Drawing Sheets

(56) References Cited

U.S. PATENT DOCUMENTS

| | | | |
|---|---|---|---|
| 5,076,403 A * | 12/1991 | Mitsui | F16F 9/532 |
| | | | 188/266.1 |
| 5,704,111 A * | 1/1998 | Johnson | H02K 1/30 |
| | | | 29/451 |
| 5,798,887 A * | 8/1998 | Yoshida | G11B 17/028 |
| | | | 360/99.04 |
| 5,847,476 A * | 12/1998 | Elsing | G11B 19/2018 |
| | | | 310/51 |
| 5,925,946 A | 7/1999 | Weingord et al. | |
| 6,256,288 B1 | 7/2001 | Yamauchi et al. | |
| 6,281,607 B1 * | 8/2001 | Petach | F04C 2/14 |
| | | | 267/156 |
| 6,320,287 B1 * | 11/2001 | Watson | H02K 1/185 |
| | | | 310/254.1 |
| 6,407,882 B1 | 6/2002 | Katahara et al. | |
| 6,512,314 B1 * | 1/2003 | Nakanishi | H02K 1/185 |
| | | | 310/49.01 |
| 6,751,051 B1 | 6/2004 | Garbarino | |
| 6,809,898 B1 | 10/2004 | Prochazka | |
| 6,930,416 B1 * | 8/2005 | Remington | H02K 1/185 |
| | | | 310/216.113 |
| 6,980,394 B2 | 12/2005 | Inoue et al. | |
| 7,382,068 B2 * | 6/2008 | Hsu | H02K 1/187 |
| | | | 310/216.124 |
| 8,310,116 B2 | 11/2012 | Higuchi et al. | |
| 2003/0169530 A1 * | 9/2003 | Tamura | G11B 33/122 |
| | | | 360/93 |
| 2007/0012535 A1 | 1/2007 | Matheny | |
| 2008/0143198 A1 * | 6/2008 | Bi | H02K 1/187 |
| | | | 310/51 |
| 2011/0127860 A1 | 6/2011 | Shin et al. | |
| 2015/0294683 A1 * | 10/2015 | Harper | H02K 3/20 |
| | | | 360/75 |
| 2016/0322880 A1 * | 11/2016 | Bradley | H02K 1/04 |
| 2017/0110932 A1 | 4/2017 | Berkouk et al. | |
| 2019/0214049 A1 | 7/2019 | Harper et al. | |

FOREIGN PATENT DOCUMENTS

| | | | | |
|---|---|---|---|---|
| CN | 203301296 U | * | 11/2013 | |
| CN | 203434763 U | * | 2/2014 | H02K 1/187 |
| CN | 204013168 U | | 12/2014 | |
| DE | 202013006845 U1 | * | 8/2013 | F04D 29/668 |
| DE | 102015121219 A1 | | 6/2017 | |
| EP | 1156141 A1 | * | 11/2001 | D01H 1/244 |
| GB | 2293695 A | | 4/1996 | H02K 1/185 |
| JP | 03273845 A | * | 12/1991 | H02K 1/185 |
| JP | 11234946 A | * | 8/1999 | |
| JP | 2007085254 A | * | 4/2007 | H02K 1/185 |
| JP | 4871216 B2 | * | 2/2012 | H02K 1/187 |

OTHER PUBLICATIONS

Park et al., "Shock and vibration isolation of laptop hard disk drive using rubber mount," Microsystem Technologies, vol. 18, 2012, pp. 1559-1566.
Restriction Requirement from U.S. Appl. No. 15/867,556, dated Oct. 30, 2018.
Non-Final Office Action from U.S. Appl. No. 15/867,556, dated Jan. 24, 2019.
Notice of Allowance from U.S. Appl. No. 15/867,556, dated May 10, 2019.
Supplemental Notice of Allowance from U.S. Appl. No. 15/867,556, dated Jun. 26, 2019.
Supplemental Notice of Allowance from U.S. Appl. No. 15/867,556, dated Jul. 5, 2019.
Harper et al., U.S. Appl. No. 16/452,335, filed Jun. 25, 2019.
Harper et al., U.S. Appl. No. 16/449,186, filed Jun. 21, 2019.

* cited by examiner

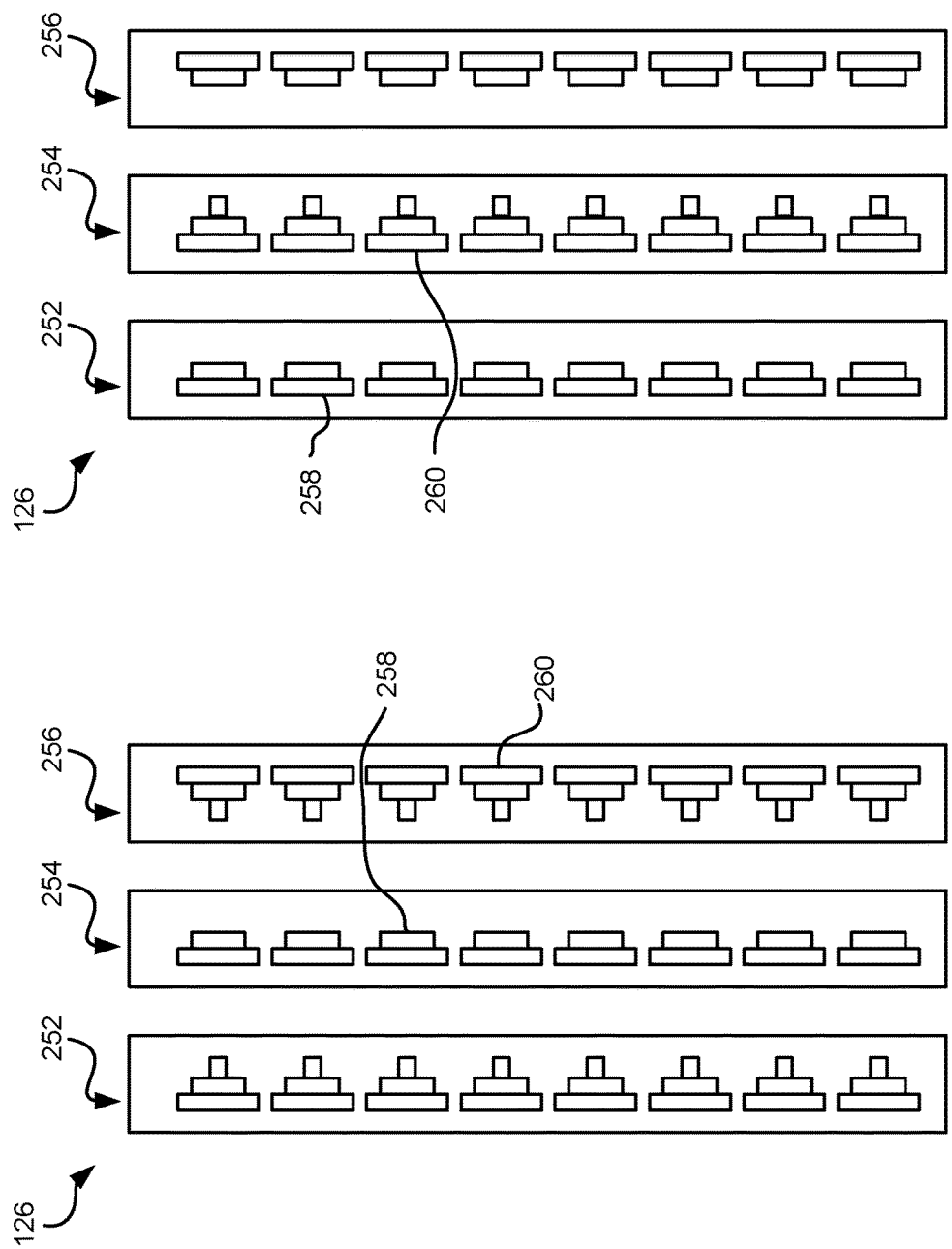

ATTENUATING REACTION FORCES CAUSED BY EXTERNALLY SUPPORTED STATORS IN BRUSHLESS DC MOTORS

BACKGROUND

The present invention relates to magnetic tape drives, and more particularly, this invention relates to attenuating reaction forces in magnetic tape drive motors.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Brushless direct current (DC) motors are used in tape drives to induce motion of the magnetic tape over the tape head, as brushless DC motors enable high speed tape motion in a compact form factor. Moreover, brushless DC motors have desirably long lifetimes, as they do not include brush contacts which eventually wear out with use over time. Internally, brushless DC motors generally include a stationary stator that has legs which are wrapped with coil windings. The legs provide a magnetic path that couples with a sub-assembly, and is thereby able to induce a relative rotational movement between the sub-assembly and the stator. Specifically, the coupling of the magnetic paths to the magnetic field generated by the coils wrapped around the stator legs create a torque which thereby includes the rotational motion which may selectively be used to transport tape from supply reel to take-up reel, and/or vice versa. However, while a net resulting torque is being generated by the magnetic coupling effect in the motor, there are also subtle oscillations in the torque. These oscillations cause the torque waveform output by brushless DC motors to have a cyclical nature.

Moreover, because the stator is magnetically coupled to the rotor sub-assembly, the forces acted on the rotor sub-assembly by cycling the electrical current through the coils of the stator, are also acted on the stator legs themselves, and hence the stator support feature as well. Furthermore, these reaction forces are transmitted throughout the main support plate also, as the stator is rigidly coupled to the main support plate in conventional brushless DC motors. Many conventional brushless DC motors also implement a tape drive deck plate that supports both the motor itself as well as the head actuator assembly used to perform read/write operations.

Accordingly, although undesirable variations in the torque waveform are produced at the stator level, these disturbances are transmitted up to the magnetic tape head itself. The spacing between the magnetic tape head and a magnetic medium positioned thereover becomes unstable as a result of these disturbances as well, thereby negatively effecting the position error signal (PES) during operation. Again, as tape drive capacities trend toward higher capacities, the detrimental effects of these instabilities is only compounded.

SUMMARY

An apparatus, according to one embodiment, includes: a support plate, a stator, at least one isolation mount coupled between the support plate and the stator for reducing transfer of vibration from the stator to the support plate, and a rotor sub-assembly. Furthermore, the rotor sub-assembly is configured to rotate relative to the support plate and the stator, the rotor sub-assembly including: a magnet, and a hub rotatably fixed relative to the magnet.

As mentioned above, the isolation mounts desirably act to reduce vibration caused by the stator. Accordingly, the insulator serves as a vibration insulator which dampens disturbances caused by the stator and/or the sub-assembly from effecting the support plate and/or other components which may be coupled to the support plate, e.g., such as a magnetic head of the tape drive in which the motor may be located.

It follows that the support plate and the stator are desirably not in direct contact with each other. Rather, an inner circumference of the support plate is separated from an outer circumference of the stator by a gap, and the at least one isolation mount is positioned in the gap. Thus, the at least one isolation mount couples the stator to the support plate, thereby insulating the support plate from vibrational disturbances.

In order to achieve the desirable vibrational insulative properties mentioned above, the at least one isolation mount includes a viscoelastic material. Moreover, the viscoelastic material may be a material characterized by converting kinetic energy into heat.

A brushless DC motor, according to another embodiment, includes: a support plate, a stator, at least one isolation mount coupled between the support plate and the stator for reducing transfer of vibration from the stator to the support plate, and a rotor sub-assembly. Furthermore, the rotor sub-assembly is configured to rotate relative to the support plate and the stator, the rotor sub-assembly including: a magnet, and a hub rotatably fixed relative to the magnet.

Again, the isolation mounts desirably act to reduce vibration caused by the stator. Accordingly, the insulator serves as a vibration insulator which dampens disturbances caused by the stator and/or the sub-assembly from effecting the support plate and/or other components which may be coupled to the support plate, e.g., such as a magnetic head of the tape drive in which the motor may be located.

It follows that the support plate and the stator are desirably not in direct contact with each other. Rather, an inner circumference of the support plate is separated from an outer circumference of the stator by a gap, and the at least one isolation mount is positioned in the gap. Thus, the at least one isolation mount couples the stator to the support plate, thereby insulating the support plate from vibrational disturbances.

In order to achieve the desirable vibrational insulative properties mentioned above, the at least one isolation mount includes a viscoelastic material. Moreover, the viscoelastic material may be a material characterized by converting kinetic energy into heat.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for reducing the effects that a brushless DC motor has on its surrounding environment. Accordingly, some of the embodiments included herein may desirably improve the read and/or write accuracy of a tape drive in which the motor may be implemented, e.g., as will be described in further detail below.

In one general embodiment, an apparatus includes: a support plate, a stator, at least one isolation mount coupled between the support plate and the stator for reducing transfer of vibration from the stator to the support plate, and a rotor sub-assembly. Furthermore, the rotor sub-assembly is configured to rotate relative to the support plate and the stator, the rotor sub-assembly including: a magnet, and a hub rotatably fixed relative to the magnet.

In another general embodiment, a brushless DC motor includes: a support plate, a stator, at least one isolation mount coupled between the support plate and the stator for reducing transfer of vibration from the stator to the support plate, and a rotor sub-assembly. Furthermore, the rotor sub-assembly is configured to rotate relative to the support plate and the stator, the rotor sub-assembly including: a magnet, and a hub rotatably fixed relative to the magnet.

Figure 1A:
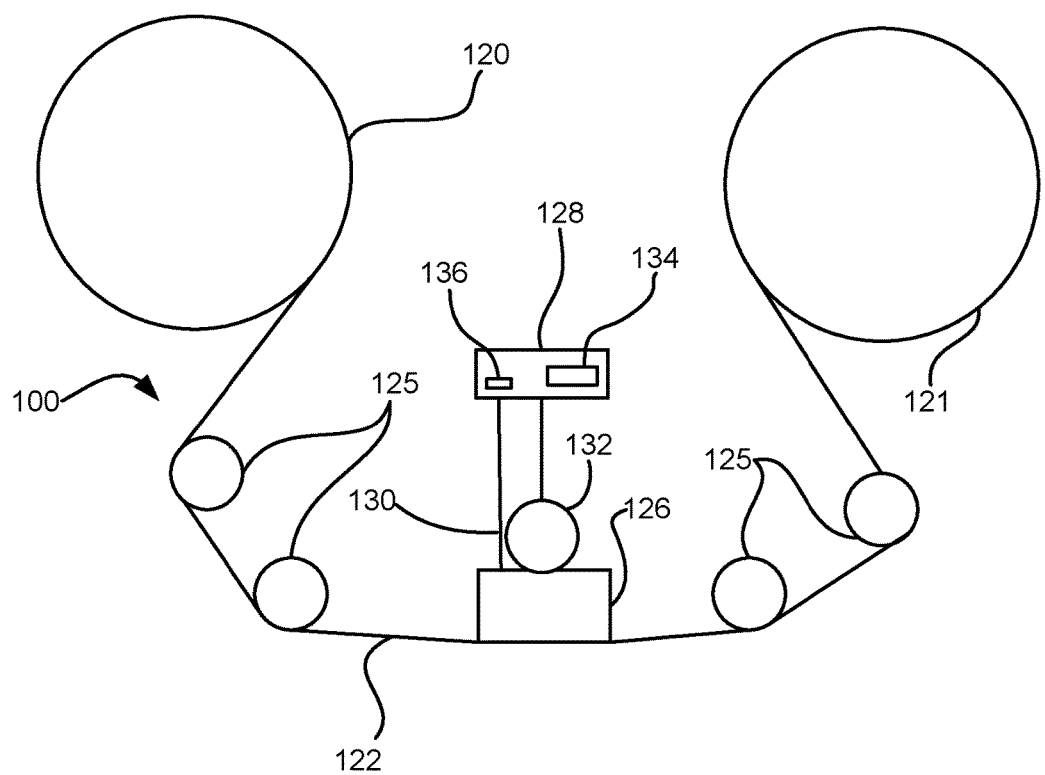
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include one or more drive motors (e.g., see FIGS. 10A-11B below) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
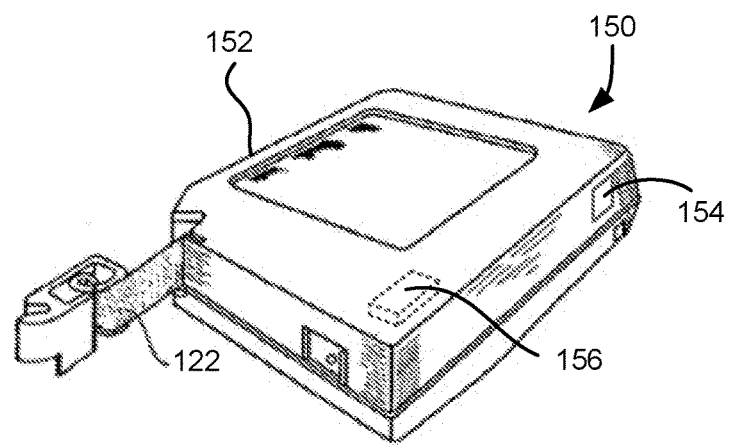
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
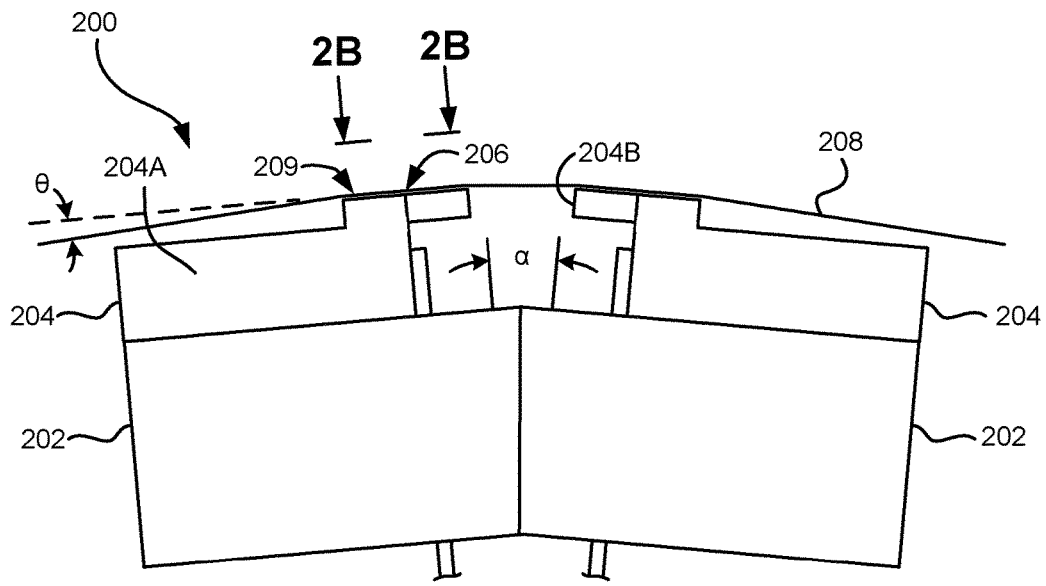
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
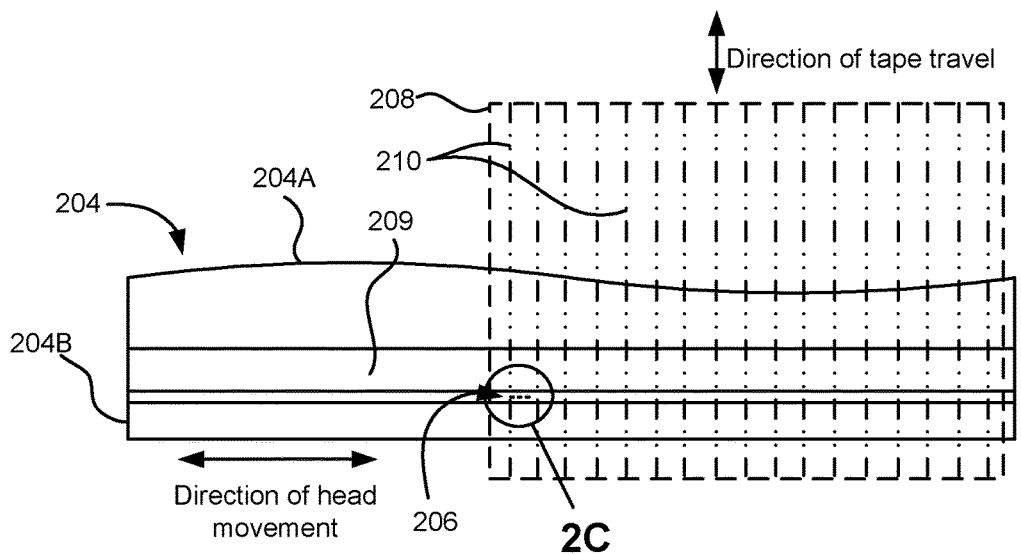
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
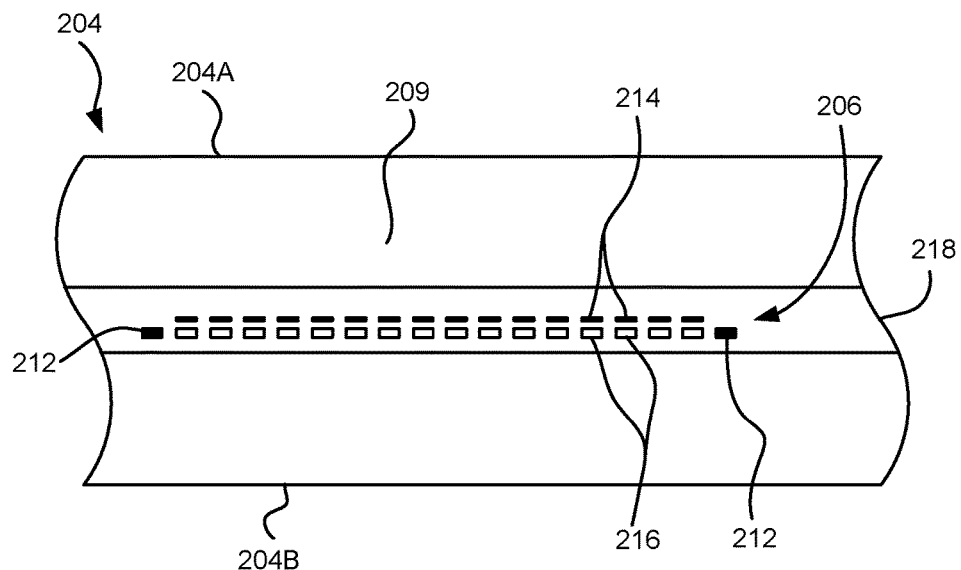
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
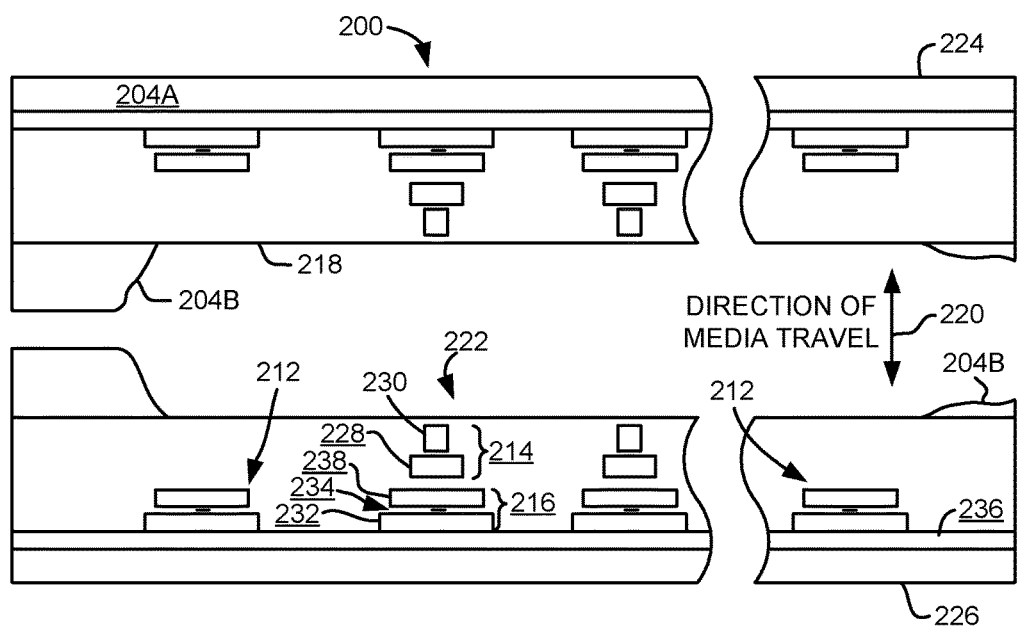
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or backward direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
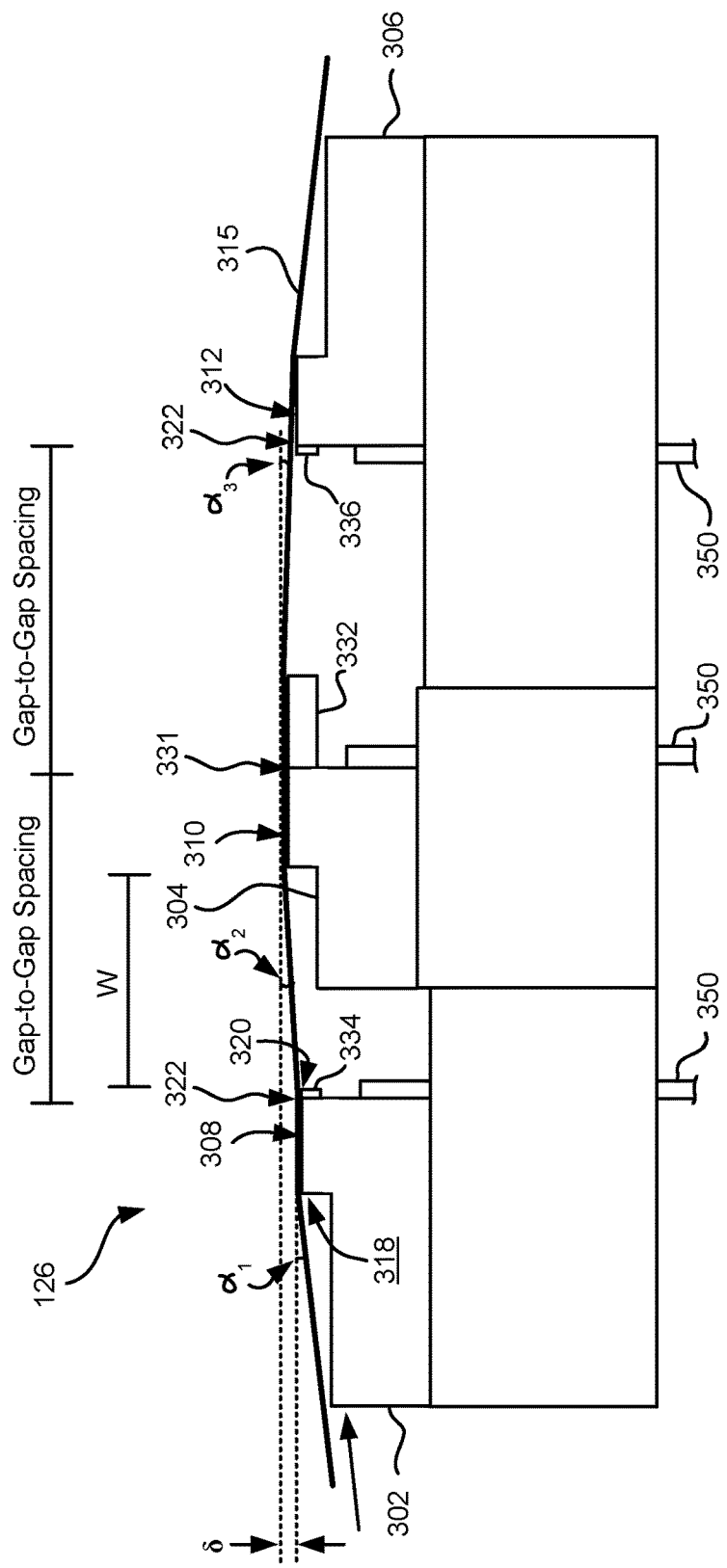
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
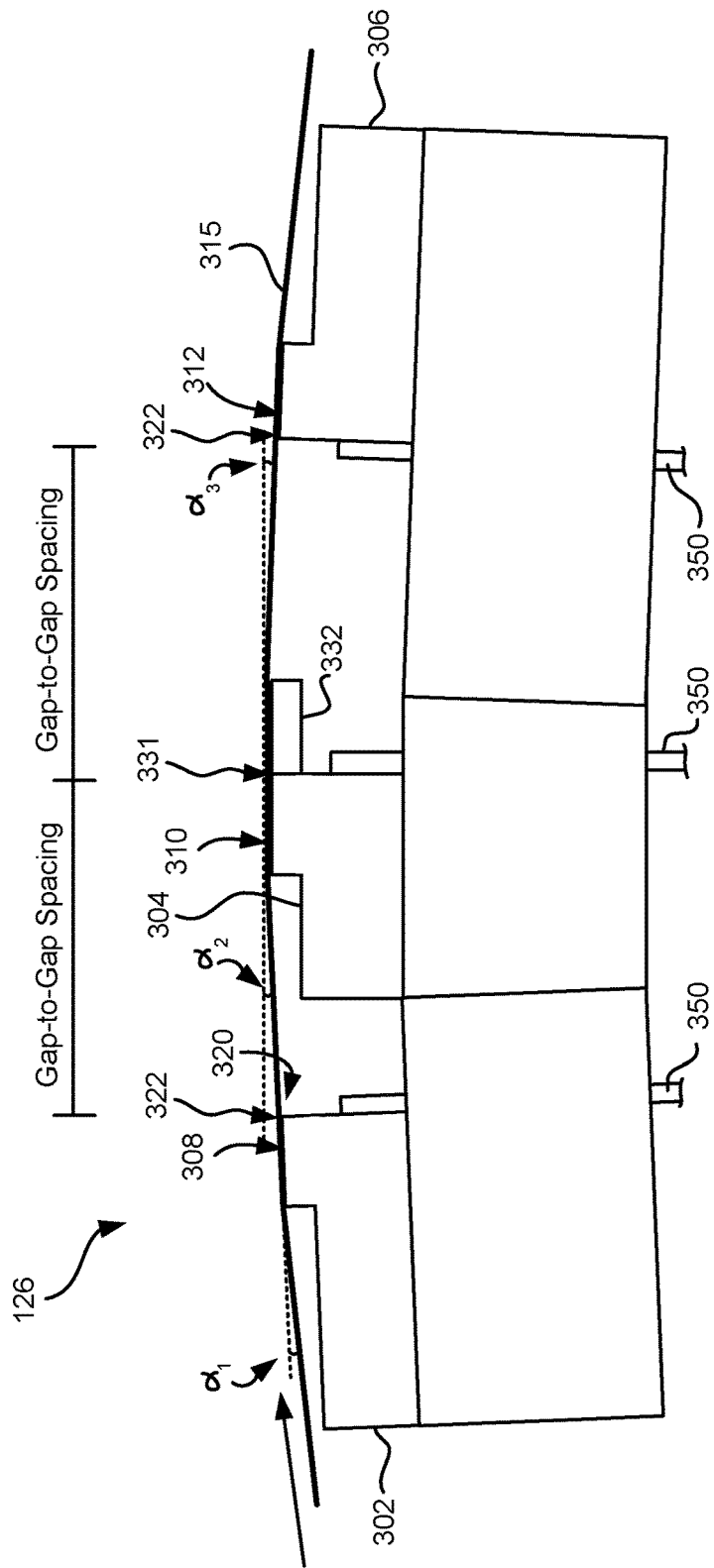
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
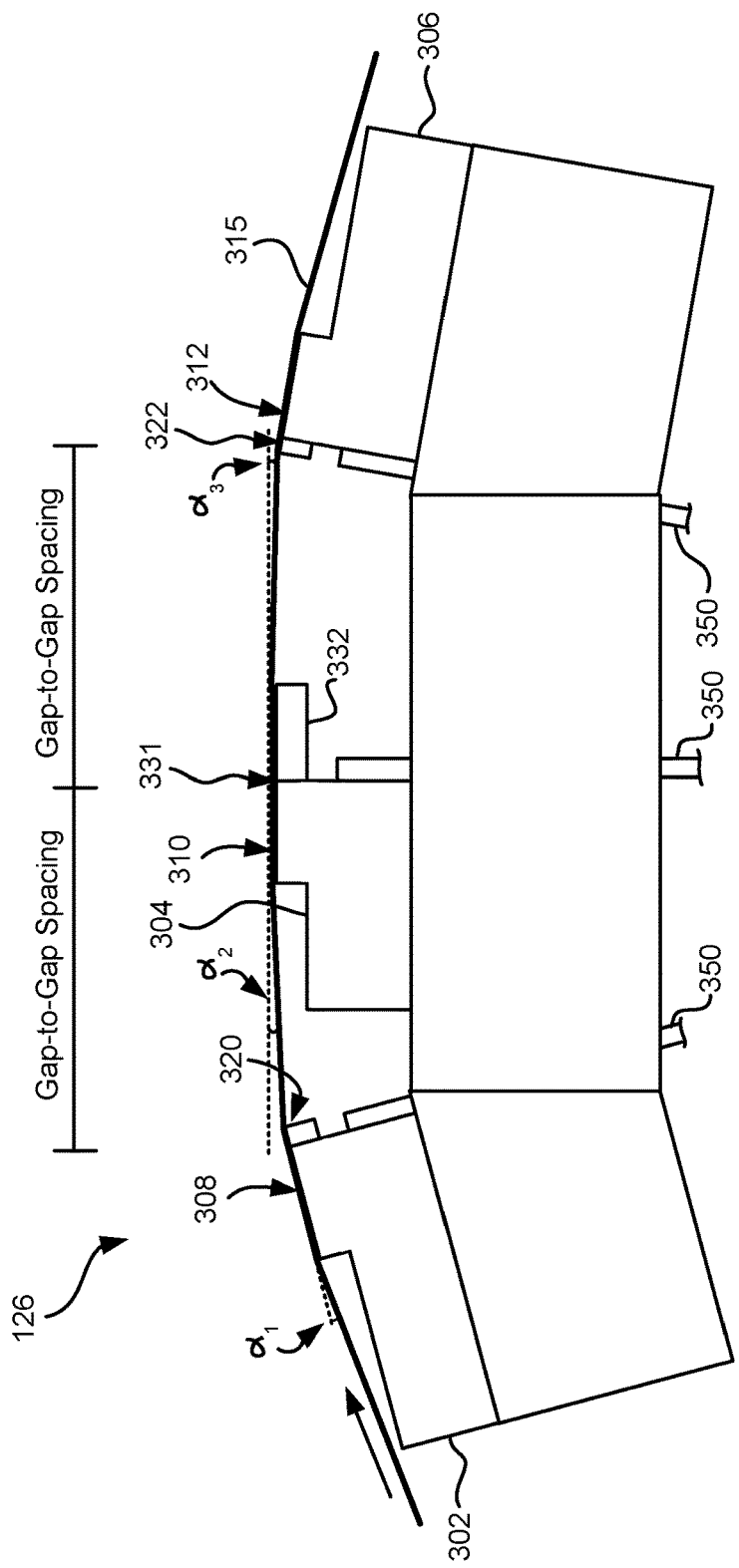
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
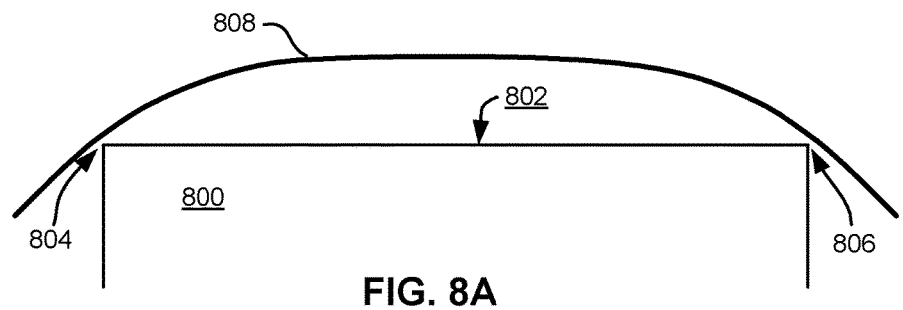
FIGS. 8A-8C are schematics depicting the principles of tape tenting.
Figure 8B:
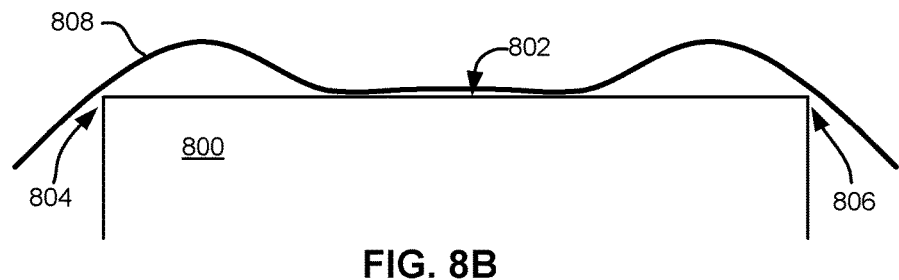
Figure 8C:
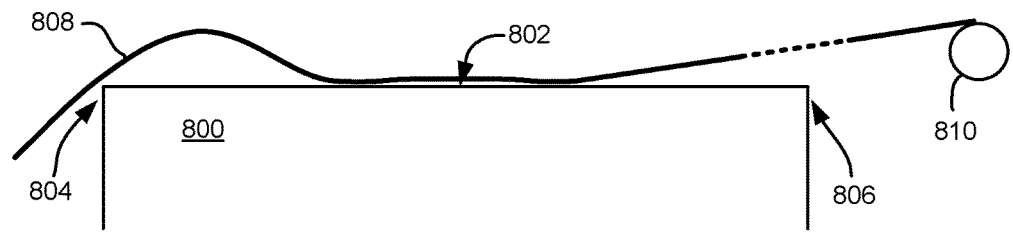

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
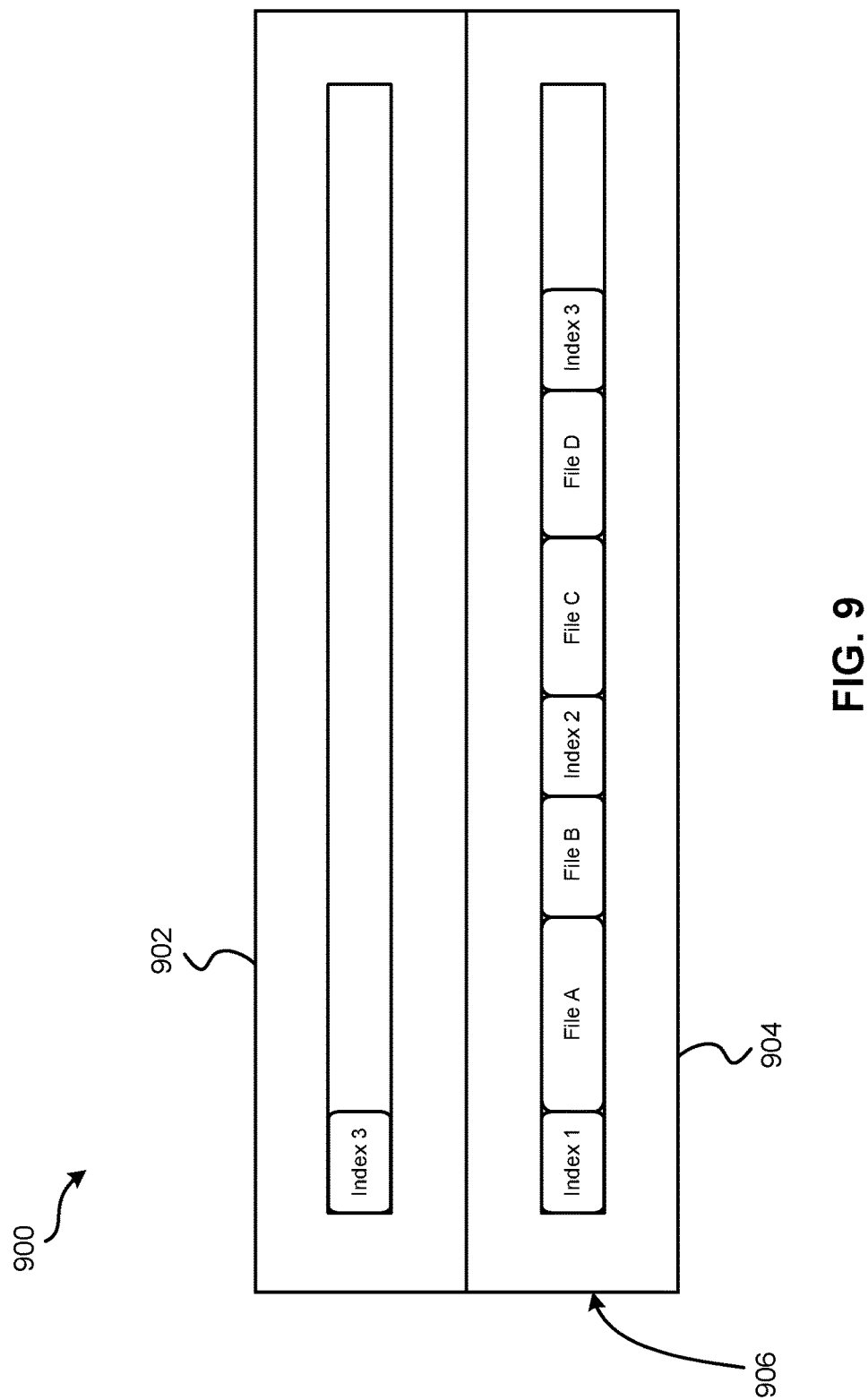
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, brushless DC motors are used in many tape drives to induce motion of the magnetic tape over the tape head, as brushless DC motors enable high speed tape motion in a compact form factor. Moreover, brushless DC motors have desirably long lifetimes, as they do not include brush contacts which eventually wear out with use over time.

Internally, brushless DC motors may include a stator which has legs that are wrapped with coil windings. Although the stator itself is stationary, electrical currents may be selectively passed through the coil windings. As a result, the legs of the stator may provide a magnetic path that couples with a rotating sub-assembly having a multi poled magnet. The coupling of the magnetic paths to the magnetic field generated by the coils wrapped around the stator legs create the desired torque, and hence induces relative rotational movement between the sub-assembly and the stator. The rotational motion is used to transport tape from one reel to another reel (e.g., supply reel to take-up reel, and/or vice versa). The number of poles on the magnet, as well as the number of stator legs, and overall size of the components may be varied according to the desired performance of the device in which the motor is implemented.

While a net resulting torque is being generated by the magnetic coupling effect in the motor, there are also subtle oscillations in the torque. These oscillations cause the torque waveform output by brushless DC motors to have a cyclical nature. Moreover, because the stator is magnetically coupled to the rotor sub-assembly, the forces acted on the rotor sub-assembly by cycling the electrical current through the coils of the stator, also have an effect on the stator legs themselves.

These effects are also realized by any features or components which may be directly coupled to the stator. In conventional brushless DC motors, a support plate of the motor is directly and rigidly coupled to the stator, and therefore these reaction forces are transmitted throughout the main support plate as well. Many conventional products also implement a tape drive deck plate that supports both the motor itself as well as the head actuator assembly used to perform read/write operations. Accordingly, although variations in the torque waveform produce subtle oscillations at the stator level, these disturbances are transmitted all the way up to the magnetic tape head itself in conventional products. The spacing between the magnetic tape head and a magnetic medium positioned adjacent thereto becomes unstable as a result of these disturbances as well, thereby negatively effecting the position error signal (PES) during operation. Again, as tape drive capacities continually increase, the detrimental effects of these instabilities experienced in conventional products are only compounded, thereby further reducing performance.

In sharp contrast to these shortcomings experienced by conventional products, various ones of the approaches described herein achieve motor configurations which are able to dampen the effects that the torque oscillations have on a remainder of the environment in which the motor is located. For example, by confining the torque oscillations such that they are only detected in the region of the motor in which the stator is positioned, some of the embodiments described herein are able to desirably reduce the effect that the motor has on surrounding components. In approaches where the motor is included in a tape drive environment, the improvements achieved by the approaches included herein are able to improve the efficiency and accuracy by which a magnetic head of the tape drive is able to read from, write to, locate on, etc. a magnetic tape loaded in the tape drive, e.g., as will be described in further detail below. Accordingly, the various approaches included herein may be able to significantly improve performance of tape drives and storage libraries in which they may be positioned.

Figure 10A:
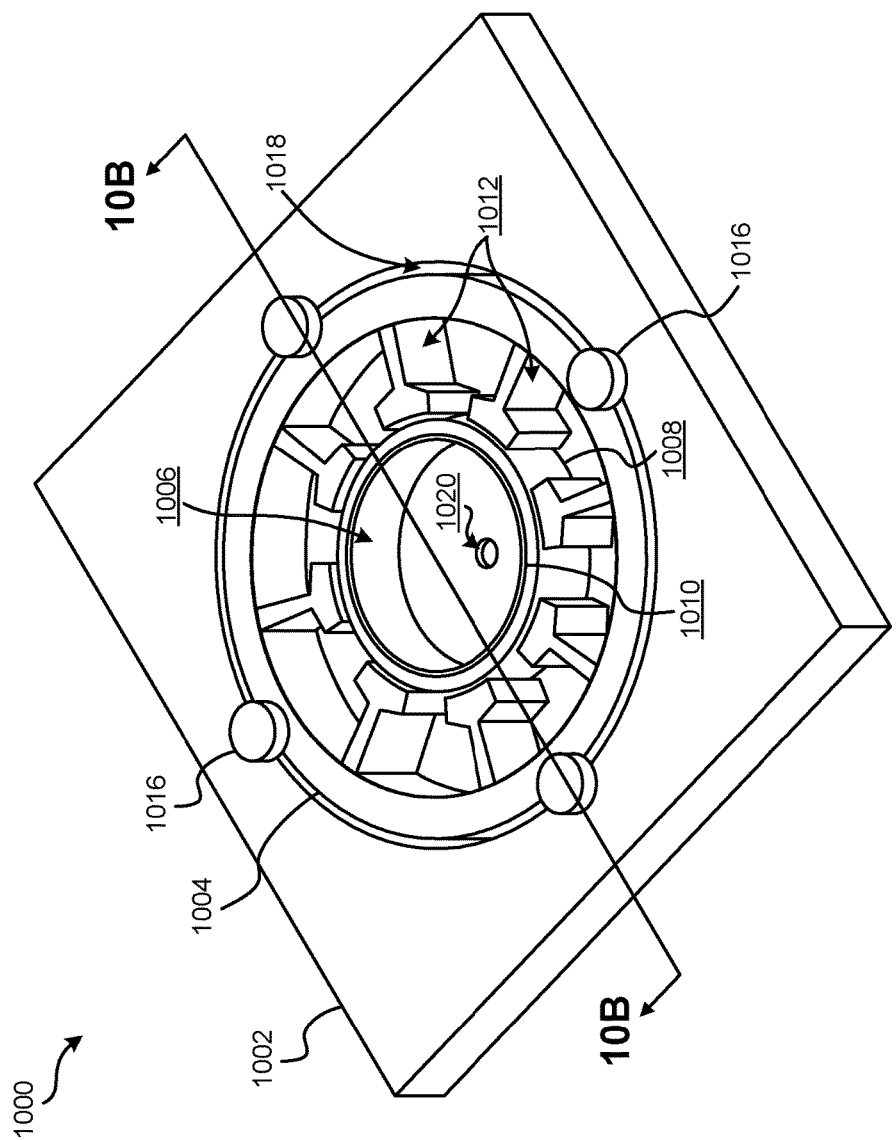
FIG. 10A is a partial perspective view of a brushless DC motor according to one embodiment.
Figure 10B:
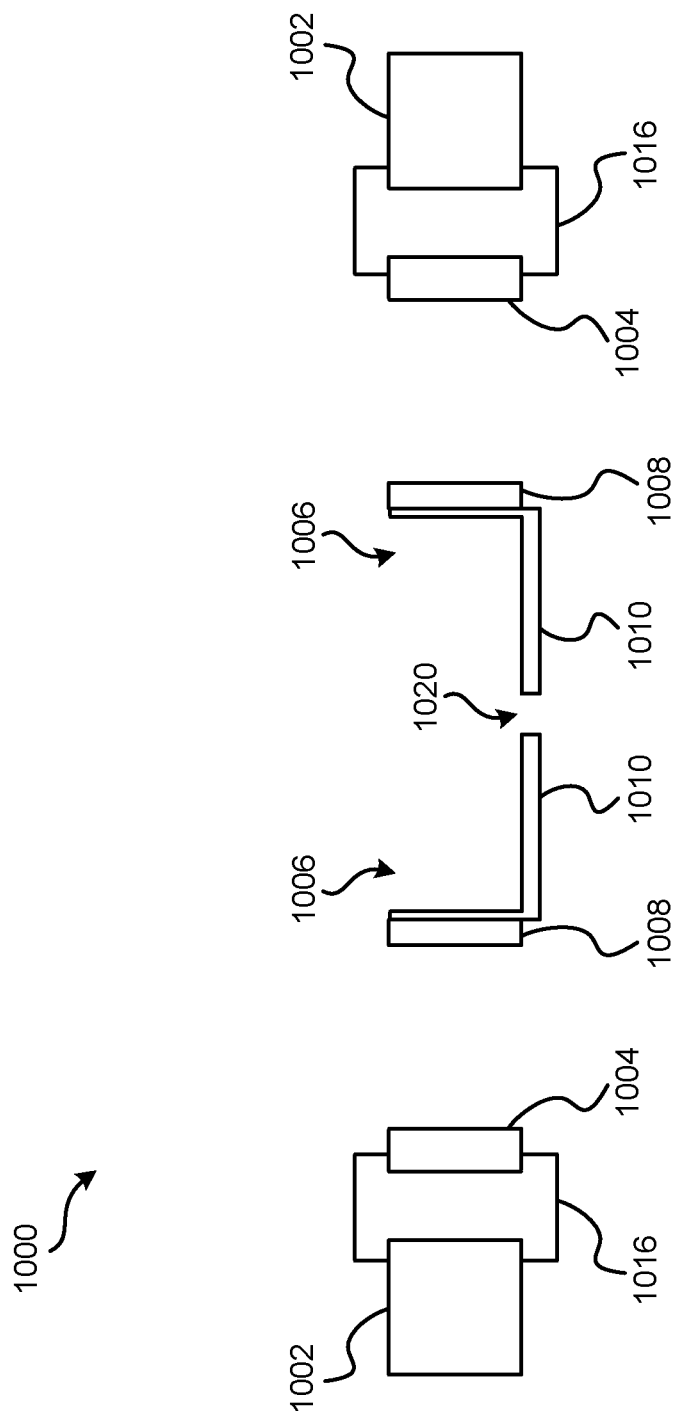
FIG. 10B is a partial cross-sectional view of the brushless DC motor in FIG. 10A taken along line 10B-10B.

Looking to FIGS. 10A-10B, an externally supported brushless DC motor 1000 is illustrated in accordance with one embodiment. As an option, the present brushless DC motor 1000 may be implemented in conjunction with features from any other embodiment listed herein, such as those described with reference to the other FIGS. For example, the brushless DC motor 1000 may be implemented in a tape drive, e.g., as seen in FIG. 1A. However, such brushless DC motor 1000 and others presented herein may be used in various applications and/or in permutations which may or may not be specifically described in the illustrative embodiments listed herein. Further, the brushless DC motor 1000 presented herein may be used in any desired environment. Thus FIGS. 10A-10B (and the other FIGS.) may be deemed to include any possible permutation.

Referring specifically to the partial perspective view in FIG. 10A, the brushless DC motor 1000 is shown as including a main support plate 1002 which surrounds a stator 1004. As shown, the stator 1004 in turn surrounds a rotor sub-assembly 1006, which includes a magnet 1008 and a hub 1010 portion. Although not shown in FIG. 10A, the main support plate 1002 is preferably coupled to a stationary component of a surrounding environment, e.g., such as an exterior housing of the motor, a frame of a tape drive in which the motor is positioned, etc., thereby making the main support plate 1002 non-rotatable. According to one example, the main support plate 1002 may be a deck casting which holds the motor(s) for tape transport in a tape drive system. Thus, the main support plate 1002 may be considered mechanical ground as would be appreciated by one skilled in the art after reading the present description.

The stator 1004 includes a plurality of legs 1012 which extend towards a center of the stator 1004. Moreover, each of the legs 1012 are preferably wrapped with one or more series of coils (not shown) which are configured to pass a sequence of electrical currents therethrough. Accordingly, each of the one or more series of coils may be coupled to a controllable current supply which is capable of providing a current having a sufficient amplitude and in both positive and negative (e.g., forward and backward) directions along length of the wires which form the respective coils.

As mentioned above, passing a current through the coil windings which wrap the legs 1012 of the stator 1004 effectively creates a magnetic field. Thus, the stator 1004 may be used to provide a magnetic path that couples with the magnet 1008 of the sub-assembly 1006. The magnet 1008 also preferably includes multiple poles which produce multiple magnetic paths that couple to the magnetic field created by the coils of the stator 1004. This coupling of the magnetic paths to the generated magnetic field creates a resulting torque which acts on the sub-assembly 1006.

As described above, the rotor sub-assembly 1006 is preferably able to rotate, e.g., to unwind/wind a magnetic tape from/onto a supply reel. Thus, the torque acting on the sub-assembly 1006 induces a rotational movement of the sub-assembly 1006, e.g., at least with respect to the main support plate 1002 and stator 1004 which are preferably nonrotatable. It follows that the rotor sub-assembly 1006 is preferably configured to rotate relative to the main support plate 1002 and the stator 1004. Accordingly, the magnet 1008 and hub 1010 are also shown as having a general circular shape to facilitate the rotational motion of the sub-assembly 1006. Moreover, the hub 1010 is preferably rotatably fixed relative to the magnet 1008 such that both the magnet 1008 and the hub 1010 rotate with each other in unison, e.g., as a single unit. Accordingly, the hub 1010 preferably includes a magnetic material which is able to provide a flux path for the attached magnet 1008, thereby bonding the hub and magnet 1008 together. However, in other approaches the hub 1010 and magnet 1008 may be bonded together using adhesives, fasteners, clamps, etc.

It should be noted that the number of poles on the magnet 1008, the number and/or size of the legs 1012 in the stator 1004, the number of coil wraps made around each of the legs 1012, etc., may be varied from the particular embodiments illustrated and/or described herein in order to adjust the performance characteristics of a resulting motor, e.g., as would be appreciated by one skilled in the art after reading the present description.

Referring still to FIG. 10A, although various ones of the components (features) included in the motor 1000 may be in direct contact with each other (e.g., such as the magnet 1008 and the hub 1010), it should be noted that the stator 1004 and the main support plate 1002 are not directly coupled to each other. Rather, at least one isolation mount 1016 couples the stator 1004 to the main support plate 1002. The at least one isolation mount 1016 preferably includes a viscoelastic material (e.g., such as rubber) which is characterized by converting kinetic energy into heat. Thus, the at least one isolation mount 1016 may act as a vibration insulator which dampens any disturbances caused by the stator 1004 from effecting the main support plate 1002 and/or other components which may be coupled to the main support plate 1002, e.g., as will be described in further detail below. However, depending on a number of isolation mounts 1016 and/or a configuration of the one or more isolation mounts 1016, portions of the stator 1004 and support plate 1002 may not have an isolation mount positioned therebetweeen. However, as described above, it is preferred that the stator 1004 and the main support plate 1002 are not directly coupled to each other. Thus, in some approaches a gap exists between the stator 1004 and the support plate 1002 such that the stator 1004 and support plate 1002 refrain from coming into direct contact with each other. In further approaches, the isolation mount 1016 may be coupled to the outer circumference of the stator 1004 and/or the inner circumference of the main support plate 1002 using adhesives, fasteners, retention by friction, slot and grooves, etc., depending on the desired embodiment.

Looking to FIG. 10A, the motor 1000 includes four separate isolation mounts 1016 positioned between the stator 1004 and support plate 1002. Accordingly, the regions between each of the isolation mounts 1016 include a gap 1018 between an outer circumference of the stator 1004 and the inner circumference of the main support plate 1002. The width of the gap between the stator 1004 and support plate 1002 is effectively defined by the dimensions of the isolation mounts 1016, and therefore may have a same thickness as the isolation mounts 1016 measured in the same direction or along the same plane. However, in some approaches, the stator 1004 and/or the main support plate 1002 may have notches (e.g., indents) which cause at least a portion of the isolation mounts 1016 to be recessed into the body of the stator 1004 and/or the main support plate 1002 respectively. These notches may add stability and ensure that the isolation mounts 1016 do not shift during use of the motor 1000, but are in no way required. However, it should again be mentioned that the stator 1004 and the main support plate 1002 are not directly coupled to each other regardless of the dimensions of the at least one isolation mount 1016.

As mentioned above, the isolation mounts 1016 act as a vibration insulator which dampen any disturbances caused by the stator 1004 and/or the sub-assembly 1006 from effecting the main support plate 1002 and/or other components which may be coupled to the main support plate 1002, e.g., such as a magnetic head of the tape drive in which the motor 1000 may be located. Thus, the isolation mounts 1016 are preferably configured to reduce the transfer of vibration from the stator 1004 to the support plate 1002. In addition to separating the stator 1004 and support plate 1002 from being in direct contact with each other, the isolation mounts 1016 preferably include one or more different materials which are able to significantly dampen (reduce) vibrational disturbances from transferring between the stator 1004 and support plate 1002.

According to one approach, the one or more isolation mounts 1016 may achieve this dampening by being constructed of a material characterized by converting kinetic energy into heat, e.g., such as viscoelastic materials. Thus, vibrational disturbances caused by the stator 1004 may be converted into heat and/or other energy byproducts rather than being translated into the main support plate 1002. This transfer of kinetic energy into heat may be achieved by the isolation mounts 1016 by rotating, compressing, expanding, etc. slightly (e.g., on a microscopic scale), due to the reaction forces exerted on it by the magnetic coupling phenomena occurring during use of the motor 1000. The isolation mounts 1016 may absorb microscopic counter rotation motion and dampen the disturbance oscillations experienced when the motor 1000 is in use, even in a rigid mount configuration. It should be noted that the configuration shown in FIGS. 10A-10B is just one of many possible configurations. Thus, the overall stiffness of the isolation mounts 1016 may be adjusted depending on the desired approach, e.g., based on the amount of vibration, the amplitude of the oscillations produced by the stator 1004, environment settings, user preference, etc. The precise configuration (e.g., material composition) and/or number of isolation mounts implemented in a given approach, may be selected in an attempt to best match the desired approach.

An illustrative list of viscoelastic materials which may be implemented in the isolation mounts 1016 includes, but is in no way limited to, various rubbers; 3M-4991 VHB pressure-sensitive, closed-cell acrylic foam adhesive available from 3M having a sales address at 3M Center, St. Paul, Minn. 55144; 3M-4945 VHB pressure-sensitive, closed-cell acrylic foam adhesive available from 3M having the same sales address; Rogers Corporation PORON® foams available from Rogers Corporation having a sales address at Rm, 1101. Bldg. A. Oriental Media Center, NO 4. Guanghua Rd, Chaoyang District, Beijing 100026, China; Roush RA205 damping foam available from Roush having a sales address at 12011 Market St., Livonia, Mich. 48150; EAR Specialty composites C1002 Isodamping thermoplastic materials available from EAR having a sales address at 7911 Zionsville Road Indianapolis, Ind. 46268; etc., or any other viscoelastic material which would be apparent to one skilled in the art after reading the present description. For instance, in some approaches, one or more of the isolation mounts 1016 may be custom molded from any one or more of the C8012, C1002, C1100, C8002, etc., series materials made by EAR. Further still, in some approaches one or more of the isolation mounts 1016 may include a laminate of layers of viscoelastic materials, each of which may be of the same type of viscoelastic material or may vary.

Various approaches described herein are able to desirably reduce or eliminate PES of tape drives by implementing isolation mounts as described herein. The isolation mounts, which preferably include one or more viscoelastic materials, may form a bridge between components of the tape drive which are otherwise separated by a gap. As a result, some of the approaches described herein are desirably able to achieve improved track following operations in comparison to conventional products. Again, the overall stiffness of the isolation mounts 1016 may be adjusted depending on the desired approach, e.g., based on the amount of vibration, the amplitude of the oscillations produced by the stator 1004, environment settings, user preference, etc.

Referring still to FIG. 10A, although the motor 1000 includes four different isolation mounts 1016, the number, size, composition, etc. of the isolation mounts 1016 may vary depending on the desired approach. According to one example, which is in no way intended to limit the invention, the motor 1000 may include a single isolation mount which extends along the interface between the stator 1004 and support plate 1002 for more than half of an outer circumference of the stator 1004 and more than half of an inner circumference of the main support plate 1002. In another example, which is again in no way intended to limit the invention, motor 1000 may include at least two isolation mounts, each of which extend along more than one third of an outer circumference of the stator 1004 and more than one third of an inner circumference of the main support plate 1002. In still another example, which again in no way intended to limit the invention, motor 1000 may include three or more isolation mounts which are evenly spaced along the interface between the main support plate 1002 and the stator 1004.

As alluded to above, it is preferred in approaches having two or more isolation mounts 1016 that each of the isolation mounts 1016 are separated evenly along the gap 1018. In other words, it is preferred that each of the isolation mounts 1016 have about an equal amount of space separating it from each other adjacent isolation mount 1016 along the gap 1018. Evenly spacing the isolation mounts 1016 allows for the motor to be better balanced and better supported, thereby improving performance and reducing instability.

As shown in FIGS. 10A-10B, each of the isolation mounts 1016 may have a cylindrical profile with end caps. The end caps preferably serve as retaining features which are able to hold the respective isolation mounts 1016 in place between the stator 1004 and the main support plate 1002 such that the isolation mounts 1016 do not slip from their intended (desired) position between the stator 1004 and main support plate 1002.

Looking specifically to the cross-sectional view in FIG. 10B, although not shown, the sub-assembly 1006 may also be supported by an axle and/or bearings in some approaches. The axle and/or bearings may provide a normal force on the sub-assembly 1006 while also facilitating the rotational movement of the sub-assembly 1006 as would be appreciated by one skilled in the art after reading the present description. Accordingly, the sub-assembly 1006 may effectively be mechanically linked to the main support plate 1002 although not specifically shown in the partial view of the motor 1000 illustrated in FIGS. 10A-10B. Moreover, the axle may include a center shaft which fits in the central hole 1020 of the hub 1010.

It follows that by externally supporting the stator of a brushless DC motor with one or more isolation mounts, disturbance vibrations caused by the torque waveform output by the stator may be significantly reduced with respect to the remainder of the motor. As a result, the motor has less of an effect on its surrounding environment, thereby greatly improving read and/or write accuracy of a tape drive in which the motor may be implemented.

While the motor configurations illustrated in FIGS. 10A-10B provide significant improvements to the performance of brushless DC motors in general and/or the environments in which they may be implemented (such as a magnetic tape drive), similar results may be achieved for motors with internally supported stators.

Figure 11A:
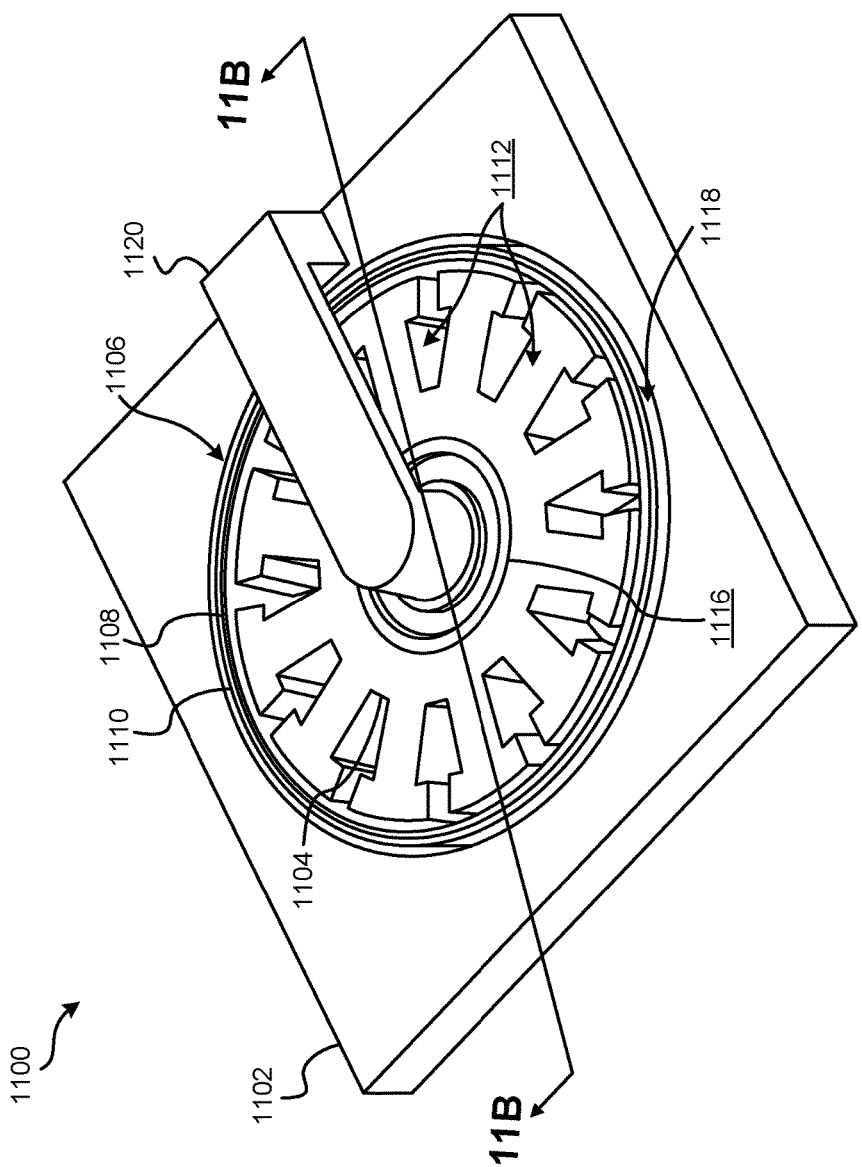
FIG. 11A is a partial perspective view of a brushless DC motor according to one embodiment.
Figure 11B:
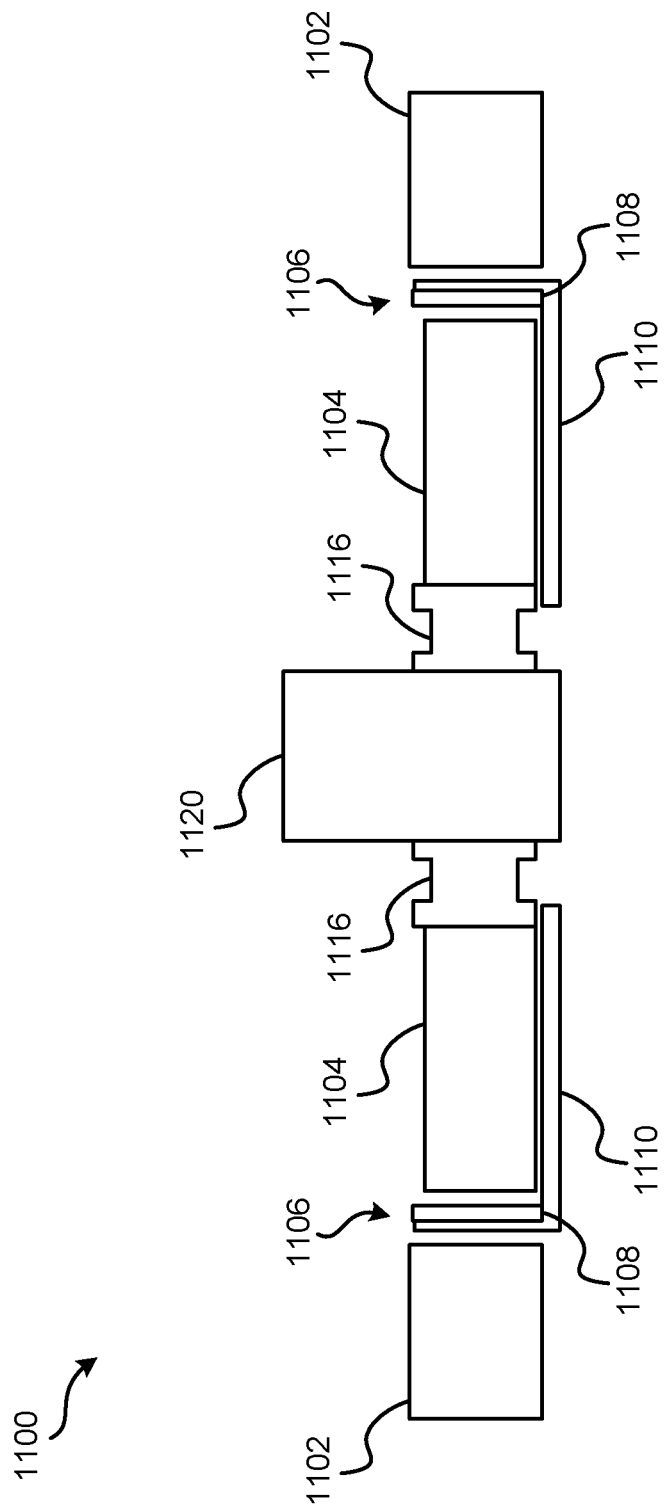
FIG. 11B is a partial cross-sectional view of the brushless DC motor in FIG. 11A taken along line 11B-11B.

Accordingly, looking to FIGS. 11A-11B, an internally supported brushless DC motor 1100 is illustrated in accordance with one embodiment. As an option, the present brushless DC motor 1100 may be implemented in conjunction with features from any other embodiment listed herein, such as those described with reference to the other FIGS. For example, the brushless DC motor 1100 may be implemented in a tape drive, e.g., as seen in FIG. 1A. However, such brushless DC motor 1100 and others presented herein may be used in various applications and/or in permutations which may or may not be specifically described in the illustrative embodiments listed herein. Further, the brushless DC motor 1100 presented herein may be used in any desired environment. Thus FIGS. 11A-11B (and the other FIGS.) may be deemed to include any possible permutation.

Referring specifically to the partial perspective view in FIG. 11A, the brushless DC motor 1100 is shown as including a main support plate 1102 which surrounds a rotor sub-assembly 1106 and a stator 1104. As shown, the rotor sub-assembly 1106 in the present embodiment surrounds the stator 1104, but may function in the same or a similar manner as the rotor sub-assembly of the motor 1000 in FIGS. 10A-10B as described above. Accordingly, the sub-assembly 1106 in FIGS. 11A-11B includes a magnet 1108 and a hub 1110 portion. Again, although not shown in FIGS. 11A-11B, the main support plate 1102 is preferably coupled to a stationary component of a surrounding environment, e.g., such as an exterior housing of the motor, a frame of a tape drive in which the motor is positioned, etc., thereby making the main support plate 1102 non-rotatable. According to one example, the main support plate 1002 may be a deck casting which holds the motor(s) for tape transport in a tape drive system. Thus, the main support plate 1102 may be considered mechanical ground as would be appreciated by one skilled in the art after reading the present description.

The main support plate 1102 may also be coupled to a first end of a stator support arm 1120 which extends between the main support plate 1102 and the stator 1104. As previously mentioned, motor 1100 is internally supported in comparison to the externally supported motor 1000 in FIGS. 10A-10B. However, referring still to FIGS. 11A-11B, it should be noted that the stator support arm 1120 and the stator 1104 itself are not in direct contact with each other. Rather, an isolation mount 1116 is positioned between a second end of the stator support arm 1120 (opposite the first end of the stator support arm 1120 coupled to the main support plate 1102) and the stator 1104. Thus, the isolation mount 1116 effectively couples the stator support arm 1120 and the stator 1104 together while also attenuating vibrational disturbances caused by the stator 1104 from translating through the stator support arm 1120 to the main support plate 1102 and beyond, e.g., as will be described in further detail below.

The stator 1104 includes a plurality of legs 1112 which extend towards a center of the stator 1104. Moreover, each of the legs 1112 are preferably wrapped with one or more series of coils (not shown) which are configured to pass a sequence of electrical currents therethrough. Accordingly, each of the one or more series of coils may be coupled to a controllable current supply which is capable of providing a current having a sufficient amplitude and in both positive and negative (e.g., forward and backward) directions along length of the wires which form the respective coils.

As mentioned above, passing a current through the coil windings which wrap the legs 1112 of the stator 1104 effectively creates a magnetic field. Thus, the stator 1104 may be used to provide a magnetic path that couples with the magnet 1108 of the sub-assembly 1106. The magnet 1108 also preferably includes multiple poles which produce multiple magnetic paths that couple to the magnetic fields created by the coils of the stator 1104. This coupling of the magnetic paths to the generated magnetic fields creates a resulting torque which acts on the sub-assembly 1106.

Again, the rotor sub-assembly 1106 is preferably able to rotate, e.g., to unwind/wind a magnetic tape from/onto a supply reel. Thus, the torque acting on the sub-assembly 1106 induces a rotational movement of the sub-assembly 1106, e.g., at least with respect to the main support plate 1102 and stator 1104 which are preferably nonrotatable. It follows that the rotor sub-assembly 1106 is preferably configured to rotate relative to the main support plate 1102 and the stator 1104. Accordingly, the magnet 1108 and hub 1110 are also shown as having a general circular shape to facilitate the rotational motion of the sub-assembly 1106. Moreover, the hub 1110 is preferably rotatably fixed relative to the magnet 1108 such that both the magnet 1108 and the hub 1110 rotate with each other in unison, e.g., as a single unit. Accordingly, the hub 1110 preferably includes a magnetic material which is able to provide a flux path for the attached magnet 1108, thereby bonding the hub and magnet 1108 together. However, in other approaches the hub 1110 and magnet 1108 may be bonded together using adhesives, fasteners, clamps, etc. Additionally, a gap 1118 (spacing) exists between the hub 1110 and the main support plate 1102 such that the sub-assembly 1106 may rotate freely without rubbing against the rotatably fixed support plate 1102.

One of the differences between motors having internally supported stators compared to externally supported stators is the size of the rotor sub-assembly. Referring momentarily back to FIG. 10A, because the stator 1004 is supported by (e.g., coupled to) the main support plate 1002 using the isolation mounts 1016, the rotor sub-assembly 1006 is located at the center of the stator 1004 such that the sub-assembly 1006 may rotate freely without compromising the stability of the stator 1004. Alternatively, referring now to FIGS. 11A-11B, an internally supported brushless DC motor 1100 may be supported at or near a center of the stator 1104 by a support arm 1120 which extends from a mechanical ground, such as the main support plate 1102. Accordingly, the rotor sub-assembly 1106 in an internally supported motor 1100 may be positioned at an exterior of the stator 1104 in order to rotate freely rather than at the center of the stator as seen in externally supported motors.

Accordingly, the rotor sub-assembly may have a larger circumference in internally supported brushless DC motors compared to similarly sized externally supported brushless DC motors. A rotor sub-assembly having a larger circumference (and thereby diameter) may translate into a motor which has a greater achievable torque compared to a rotor sub-assembly which has a smaller circumference. Accordingly, internally supported brushless DC motors may be more desirably used in certain situations, while externally supported brushless DC motors may be more desirably used in other situations.

Referring back to FIGS. 11A-11B, it should be noted that the number of poles on the magnet 1108, the number and/or size of the legs 1112 in the stator 1104, the number of coil wraps made around each of the legs 1112, etc., may be varied from the particular embodiments illustrated and/or described herein in order to adjust the performance characteristics of a resulting motor, e.g., as would be appreciated by one skilled in the art after reading the present description.

Additionally, although various ones of the components (features) included in the motor 1100 may be in direct contact with each other (e.g., such as the magnet 1108 and the hub 1110), the stator 1104 and the stator support arm 1120 are not directly coupled to each other. Rather, at least one isolation mount 1116 couples the stator 1104 to the stator support arm 1120. The at least one isolation mount 1116 preferably includes a viscoelastic material (e.g., such as rubber) which is characterized by converting kinetic energy into heat. Thus, the at least one isolation mount 1116 may act as a vibration insulator which dampens any disturbances caused by the stator 1104 from effecting the main support plate 1102 and/or other components which may be coupled to the main stator support arm 1120. However, depending on a number of isolation mounts 1116 and/or a configuration of the at least one isolation mount 1116, portions of the stator 1104 and stator support arm 1120 may not have an isolation mount (or portion thereof) positioned therebetween. However, it is again preferred that the stator 1104 and stator support arm 1120 are not directly coupled to each other. Thus, in some approaches a gap exists between the stator 1104 and the stator support arm 1120 such that the stator 1104 and stator support arm 1120 refrain from coming into direct contact with each other.

Figure 11C:
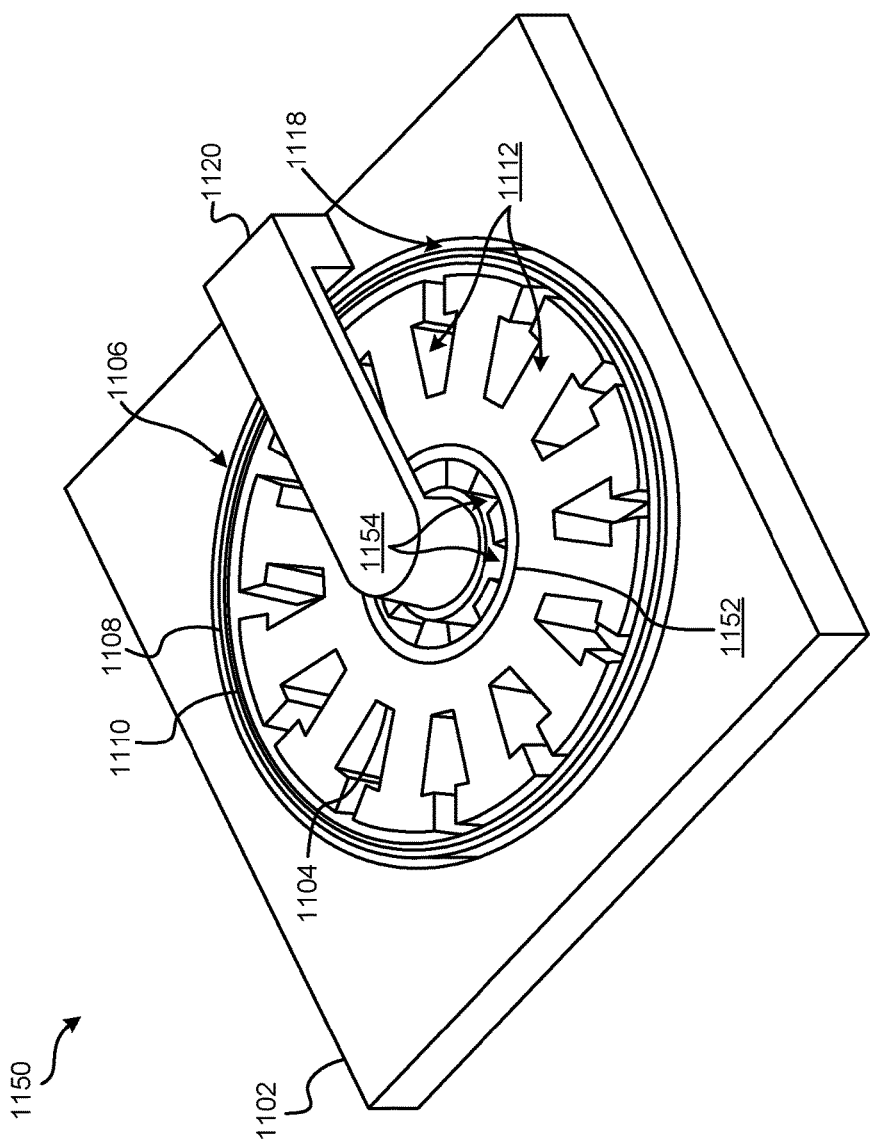
FIG. 11C is a partial perspective view of a brushless DC motor according to one embodiment.

Looking specifically to FIGS. 11A-11B, the motor 1100 includes a single isolation mount 1116 positioned between the stator 1104 and the stator support arm 1120. In the present approach, the isolation mount 1116 fully encircles the second end of the stator support arm 1120 while similarly extending along the whole inner circumference of the stator 1104. Additionally, the isolation mount 1116 is shown as being a solid piece of material having an indent in an upper and lower surface thereof. However, in other approaches the motor 1100 may include more than one isolation mount, each of which are separated by about an equal amount (e.g., see isolation mounts 1016 in FIG. 10A). For example, the motor 1100 may include at least three isolation mounts which are evenly spaced along an interface between the second end of the stator support arm 1120 and the stator 1104. Accordingly, the regions between each of the more than one isolation mount 1116 may form a gap between an inner circumference of the stator 1104 and an outer circumference of the stator support arm 1120. In such approaches, the dimension of the gap between the stator 1104 and stator support arm 1120 may effectively be defined by the dimensions of the more than one isolation mount, and therefore may have one or more same dimensions as those of the isolation mounts measured in the same direction or along a same plane. In other approached, the isolation mount 1116 fully encircles the second end of the stator support arm 1120, e.g., as seen in FIGS. 11A-11B, but may further have vias formed therethrough. Referring momentarily to FIG. 11C, a motor 1150 having an isolation mount 1152 with vias 1154 formed therethrough is illustrated in accordance with an illustrative embodiment which is in no way intended to limit the invention. It follows that the isolation mounts included herein may take any desired shape depending on the approach. Such geometric changes may be made to the isolation mounts described herein to provide a sufficient overall support of the stator, while also providing sufficient damping of disturbances emanating from the stator.

However, in some approaches, the stator 1104 and/or the stator support arm 1120 may have notches (e.g., indents) which cause at least a portion of the isolation mount 1116 to be recessed into the body of the stator 1104 and/or the stator support arm 1120 respectively. These notches may add stability and ensure that the isolation mounts 1116 do not shift during use of the motor 1100, but are in no way required. However, it should again be mentioned that the stator 1104 and the main support plate 1102 are not directly coupled to each other regardless of the dimensions of the at least one isolation mount 1116. In further approaches, the isolation mount 1116 may be coupled to the inner circumference of the stator 1104 and/or the outer circumference of the stator support arm 1120 using adhesives, fasteners, retention by friction, slot and grooves, etc., depending on the desired embodiment.

As mentioned above, the isolation mounts 1116 act as a vibration insulator which dampen any disturbances caused by the stator 1104 and/or the sub-assembly 1106 from effecting the main support plate 1102 and/or other components which may be coupled to the main support plate 1102, e.g., such as a magnetic head of the tape drive in which the motor 1100 may be located. Thus, the isolation mounts 1116 are preferably configured to reduce the transfer of vibration from the stator 1104 to the stator support arm 1120 and further the support plate 1102. In addition to separating the stator 1104 and stator support arm 1120 from being in direct contact with each other, the isolation mounts 1116 preferably include one or more different materials which are able to significantly dampen (reduce) vibrational disturbances from transferring between the stator 1104 and stator support arm 1120.

According to one approach, the one or more isolation mounts 1116 may achieve this dampening by being constructed of a material characterized by converting kinetic energy into heat, e.g., such as viscoelastic materials. Thus, vibrational disturbances caused by the stator 1104 may be converted into heat and/or other energy byproducts (e.g., sound) rather than being translated into the stator support arm 1120 and main support plate 1102. This transfer of kinetic energy into heat may be achieved by the isolation mounts 1116 by rotating, compressing, expanding, etc. slightly (e.g., on a microscopic scale), due to the reaction forces exerted on it by the magnetic coupling phenomena occurring during use of the motor 1100. The isolation mounts 1116 may absorb microscopic counter rotation motion and dampen the disturbance oscillations experienced when the motor 1100 is in use, even in a rigid mount configuration. It should be noted that the configuration shown in FIGS. 11A-11B is just one of many possible configurations. The precise configuration (e.g., material composition) and/or number of isolation mounts implemented in a given approach, may be selected in an attempt to best match the desired approach. Depending on the approach, the isolation mount 1116 may include any one or more of the viscoelastic materials described above with respect to the isolation mounts 1016 of FIGS. 10A-10B. Moreover, the overall stiffness of the isolation mount(s) 1116 may be adjusted depending on the desired approach, e.g., based on the amount of vibration, the amplitude of the oscillations produced by the stator 1104, environment settings, user preference, etc.

Looking specifically to the cross-sectional view in FIG. 11B, although not shown, the sub-assembly 1106 may also be supported by an axle and/or bearings in some approaches.

The axle and/or bearings may provide a normal force on the sub-assembly 1106 while also facilitating the rotational movement of the sub-assembly 1106 as would be appreciated by one skilled in the art after reading the present description. Accordingly, the sub-assembly 1106 may effectively be mechanically linked to the main support plate 1102, although not specifically shown in the partial view of the motor 1100 illustrated in FIGS. 11A-11B. Moreover, the axle may include a center shaft which fits in a recessed portion of the hub 1110.

It follows that by internally supporting the stator of a brushless DC motor with one or more isolation mounts, disturbance vibrations caused by the torque waveform output by the stator may be significantly reduced with respect to the remainder of the motor. As a result, the motor has less of an effect on its surrounding environment, thereby greatly improving read and/or write accuracy of a tape drive in which the motor may be implemented.

It should be noted that although various components in the motors described herein are illustrated and/or described as having a generally circular shape, any number of different shaped configurations may be implemented depending on the desired embodiment. For example, an internally supported stator may have a square center recess rather than a circular one as seen in FIGS. 11A-11B. Accordingly, the isolation mount and/or second end of the stator support arm in FIGS. 11A-11B may have a square profile as well. In other approaches, the externally supported stator in FIGS. 10A-10B may have a square shaped outer surface, along with a circular inner recess. Thus, an inner surface of the main support plate may have a square profile as well while maintaining one or more isolation mounts positioned between the main support plate and the stator according to any of the approaches described above.

Similarly, although the stator support arm 1120 in FIGS. 11A-11B extends between the main support plate 1102 and a center of the stator 1104, in other approaches the stator support arm may extend between the main support plate 1102 and an area of the stator 1104 which is not the center thereof while maintaining the desired functionality of the motor 1100 as a whole, e.g., depending on the overall shape and/or configuration of the stator 1104.

Furthermore, although only a single motor is shown in each of FIGS. 10A-10B and 11A-11B respectively, more than one motor may be implemented in a given approach. For instance, a tape drive may include two motors according to any of the approaches described herein. In some approaches the two motors may be operated in unison, e.g., in a complimentary fashion. In other approaches a first of the motors may be used during normal use of the tape drive while the second motor is maintained as a backup motor, e.g., for when the first motor fails. In still other approaches, a first motor may be used to transition a magnetic tape in a "forward direction" from the supply reel to the take-up reel, while the second motor is used to transition the magnetic tape in a "backward direction" from the take-up reel to the supply reel.

Implementing various ones of the approaches included herein are desirably able to reduce motor disturbances being transmitted through the deck casting in tape drives and/or other similar systems. By insulating the stator from a surrounding environment which is preferably stationary (e.g., such as a magnetic tape head in the same tape drive) using isolation mounts as described above, the disturbances transmitted by the reaction forces emitted from a brushless DC motor can be significantly reduced compared to conventional products. The insulation of kinetic energy and general spacing (e.g., gap) that the isolation mounts provide between the stator and a surrounding environment allows the stator to vibrate and/or rotate (e.g., on the order of a few micrometers) without allowing these oscillations to be transmitted to the surrounding environment. Rather, these disturbances are absorbed by the isolation mounts and/or are otherwise confined to the stator level, thereby insulting the brushless DC motor from having an undesirable effect on the surrounding environment. Moreover, these improvements may be achieved for both internally and externally supported brushless DC motors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a support plate;
a stator, the stator being coplanar with the support plate;
at least one isolation mount coupled between the support plate and the stator for reducing transfer of vibration from the stator to the support plate; and
a rotor sub-assembly,
wherein the rotor sub-assembly is configured to rotate relative to the support plate and the stator,
wherein the rotor sub-assembly includes:
a magnet; and
a hub rotatably fixed relative to the magnet,
wherein an inner circumference of the support plate is separated from an outer circumference of the stator by a gap, the at least one isolation mount being positioned in the gap.

2. The apparatus as recited in claim 1, wherein the at least one isolation mount includes a viscoelastic material, wherein the at least one isolation mount includes a foam and/or a thermoplastic.

3. The apparatus as recited in claim 2, wherein the at least one isolation mount includes a laminate of layers of viscoelastic materials.

4. The apparatus as recited in claim 1, wherein the at least one isolation mount is constructed of a material characterized by converting kinetic energy into heat.

5. The apparatus as recited in claim 1, wherein the at least one isolation mount couples the stator to the support plate, wherein the stator includes a plurality of legs which extend towards a center of the stator, wherein each of the plurality of legs are wrapped with one or more series of coils which are configured to pass a sequence of electrical currents therethrough.

6. The apparatus as recited in claim 1, with a proviso that the support plate and the stator are not in direct contact with each other, wherein the hub includes a magnetic material, wherein the hub is rotatably fixed relative to the magnet by a magnetic bond therebetween.

7. The apparatus as recited in claim 1, comprising one isolation mount which extends along more than half of an outer circumference of the stator and more than half of an inner circumference of the support plate.

8. The apparatus as recited in claim 1, comprising at least three isolation mounts which are evenly spaced along an interface between the support plate and the stator.

9. The apparatus as recited in claim 1, wherein each of the at least one isolation mount has a cylindrical profile with end caps, the end caps being configured to hold the at least one isolation mount in place between the stator and the support plate, wherein the stator and the support plate have notches configured to cause at least a portion of the at least one isolation mount to be recessed into a body of the stator and the support plate, respectively.

10. A drive mechanism for passing a magnetic medium over a magnetic tape head, the drive mechanism including the apparatus as recited in claim 1; and
a controller electrically coupled to the magnetic tape head, wherein the apparatus is a brushless direct current motor.

11. A brushless direct current (DC) motor, comprising:
a support plate;
a stator, the stator being coplanar with the support plate;
at least one isolation mount directly coupled between the support plate and the stator for reducing transfer of vibration from the stator to the support plate; and
a rotor sub-assembly,
wherein the rotor sub-assembly includes:
a magnet; and
a hub rotatably fixed relative to the magnet,
wherein the rotor sub-assembly is configured to rotate relative to the support plate and the stator,
wherein the at least one isolation mount couples the stator to the support plate.

12. The brushless DC motor as recited in claim 11, wherein an inner circumference of the support plate is separated from an outer circumference of the stator by a gap, the at least one isolation mount being positioned in the gap.

13. The brushless DC motor as recited in claim 12, with a proviso that the support plate and the stator are not in direct contact with each other, wherein the hub includes a magnetic material, wherein the hub is rotatably fixed relative to the magnet by a magnetic bond therebetween, wherein the hub and the magnet are in direct contact with each other.

14. The brushless DC motor as recited in claim 12, comprising at least three isolation mounts which are evenly spaced along an interface between the support plate and the stator, wherein the stator includes a plurality of legs which extend towards a center of the stator, wherein each of the plurality of legs are wrapped with one or more series of coils which are configured to pass a sequence of electrical currents therethrough.

15. The brushless DC motor as recited in claim 14, wherein each of the at least one isolation mount has a cylindrical profile with end caps, the end caps being configured to hold the at least one isolation mount in place between the stator and the support plate, wherein the stator and the support plate have notches configured to cause at least a portion of the at least one isolation mount to be recessed into a body of the stator and the support plate, respectively.

16. The brushless DC motor as recited in claim 11, wherein the at least one isolation mount includes a viscoelastic material, wherein the at least one isolation mount includes a thermoplastic.

17. The brushless DC motor as recited in claim 16, wherein the at least one isolation mount is constructed of a material characterized by converting kinetic energy into heat, wherein the at least one isolation mount includes a laminate structure of layers of viscoelastic materials, wherein each layer in the laminate structure includes a different viscoelastic material.

18. The brushless DC motor as recited in claim 11, comprising one isolation mount which extends along more than half of an outer circumference of the stator and more than half of an inner circumference of the support plate.

19. A drive mechanism for passing a magnetic medium over a magnetic tape head, the drive mechanism including the brushless DC motor as recited in claim 11; and a controller electrically coupled to the magnetic tape head.

* * * * *